Figure 1:
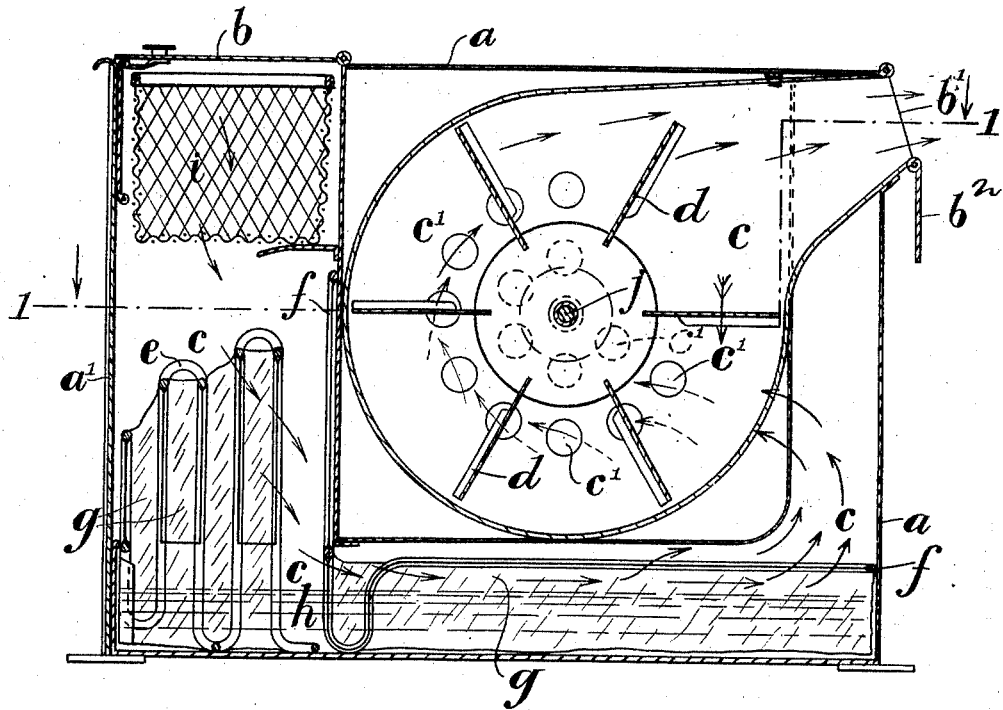

No. 760,061. PATENTED MAY 17, 1904.
G. DUBUIS.
DISINFECTING APPARATUS.
APPLICATION FILED NOV. 27, 1903.
NO MODEL. 2 SHEETS—SHEET 1.

Witnesses
L. E. Barkley
Annetta Haig

Inventor
Gabriel Dubuis
by Frank S. Appleman
atty

No. 760,061. PATENTED MAY 17, 1904.
G. DUBUIS.
DISINFECTING APPARATUS.
APPLICATION FILED NOV. 27, 1903.
NO MODEL. 2 SHEETS—SHEET 2.

No. 760,061.                                                            Patented May 17, 1904.

UNITED STATES PATENT OFFICE.

GABRIEL DUBUIS, OF PIMLICO, LONDON, ENGLAND.

DISINFECTING APPARATUS.

SPECIFICATION forming part of Letters Patent No. 760,061, dated May 17, 1904.

Application filed November 27, 1903. Serial No. 182,883. (No model.)

*To all whom it may concern:*

Be it known that I, GABRIEL DUBUIS, a citizen of the United Kingdom of Great Britain and Ireland, residing at 26 Hugh street, Pimlico, London, England, have invented a certain new and useful Improved Machine for Purifying, Disinfecting, and Scenting the Air, of which the following is a specification, such as will enable others skilled in the art to which it appertains to make and use the same.

My invention relates to an improved machine or apparatus for purifying, disinfecting, or scenting air. In one of its most simple forms the invention consists of a case or box in and through which passages for the air are formed. At any convenient part of the said passages one or more air-fans or air-propellers are fitted and are rotated by any convenient means, such as by an electric motor, water-power, or clockwork. At any suitable position in the passages a trough is formed to hold water, disinfecting or antiseptic fluid, scent, or other fluid with which it is desired to impregnate or load the air. This trough may be removable. One or more pieces of suitable fabric, such as linen, are placed across or within the air-passages, and some part of the same is allowed to drop into the water or other fluid, and thus saturate the whole of the linen or other fabric. Any suitable chemical, disinfecting, or antiseptic material or liquid is placed in the trough. If desired, one or more cages, baskets, or other suitable receptacles to hold saturated sponges, solid substances, or the like—such as ozone, eucalyptus, or pure carbon—may also be placed in the air-passages.

The method of using the invention is as follows: After the baskets have been filled and the fluid put into the trough the fan is rotated and air is drawn or pushed along the air-passages and through the baskets and through or around the fabric, which is then saturated with liquid or solution from the trough. This purifies or scents the air, which is then allowed to escape from the machine into the room and carries with it the properties of the chemical, antiseptic, disinfectant, or scented material or liquid. The air may be heated or cooled as it passes through the machine by any suitable means, such as those hereinafter described.

I will now describe my invention with reference to the accompanying drawings, in which—

Figure 2:
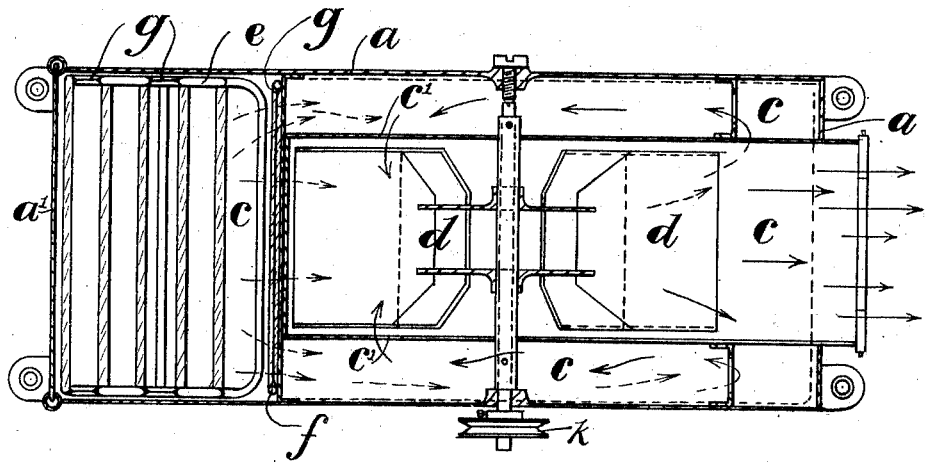
Figure 3:
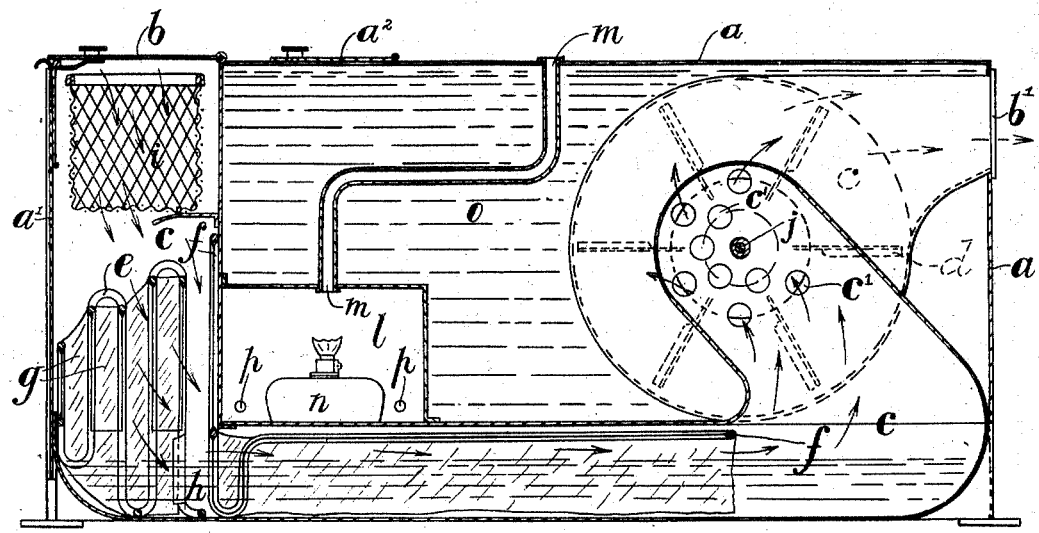

Figure 1 shows a sectional elevation of a simple form of my air-purifying machine. Fig. 2 is a sectional view on the line 1 1 of the machine shown in Fig. 1. Fig. 3 shows a sectional elevation of another form of my air-purifying machine in which provision is made for heating or cooling the air as it passes through the machine. The drawings show the machine as it would appear when the air is being heated.

In each of the drawings the arrows indicate the direction taken by the air.

Referring to Figs. 1 and 2, $a$ is the case or box of the machine, having sliding end $a'$ to give access to the interior and provided with small hinged lid or cover $b$, which may be perforated or must be opened when the machine is used and is arranged at the entrance or mouth of air-passages $c$. These passages lead from lid $b$ to and along bottom of the case, where the passage divides into two parts, one on each side of the case and between which the fan $d$ is arranged. This fan draws the air through the holes $c'$ in passages $c$ and expels it through the outlet $b'$, which may be provided with a hinged cover, as $b^2$, to prevent dust entering the machine when it is not in use. The bottom of the case contains water, disinfecting fluid such as ozone or eucalyptus, scent, or the like $h$ and supports two removable wire frames $e$ and $f$, over which fabric $g$ is stretched. Close to the lid $b$ a removable wire basket $i$ is placed at the entrance of the air-passage $c$. $j$ is the spindle of the fan $d$, and $k$ a small driving-pulley on spindle $j$.

Referring to Fig. 3, $a$ is the case with sliding end $a'$ and lid $b$. $c$ represents the air-passages leading from $b$ to outlet $b'$ and provided with holes $c'$. $d$ is the fan mounted on spindle $j$. $e$ and $f$ are wire frames supporting fabric $g$, the edges of which are shown in the water or other fluid $h$. $i$ is the wire basket, as in Fig. 1. $l$ is an opening or chamber into which a lamp $n$ is placed to heat the water $o$, which is put into the case $a$ through the cover $a^2$. The close proximity of this water to the passages $c$ heats the air as it passes through. Holes $p$ and pipe $m$ supply the necessary ventilation for the lamp. To cool the air, the lamp is dispensed with and ice or other cooling medium can be put into the case instead of the water. The inlets or outlets to the air-passages may be in any convenient positions.

It must be understood that while the drawings show only two forms or patterns of my improved air purifying or scenting machines I can make them of any suitable pattern or shape and of any size and may use any convenient means for heating or cooling the air. For hospitals, public or other buildings the case $a$ can be at any suitable part of the building, and the passages may be extended as pipes or channels to any other part, and the fans or propellers may be in the case or in the pipes or channels. The fabric $g$ may be stretched across or along the passages $c$ in any suitable manner, and any number of pieces of fabric may be used. The air-passages may be of any desired shape, and more than one fan or propeller of any suitable kind may be used, if desired.

The machine or apparatus may be used for any air-purifying, disinfecting, or scenting purposes and may be portable or be fixed, as by building into a wall or otherwise, as convenient.

In using the machine the air is preferably purified by passing it through some of the fabric before it is charged with the eucalyptus, scent, or the like.

What I claim, and desire to secure by Letters Patent, is—

In an apparatus of the character described, a box for containing fluid having partitions forming passages therein on each side, a fan within the box between the said passages, wire frames located in the box, fabric supported therein depending into the fluid in the box, said partitions having openings whereby the fan-chamber is in communication with the passages.

In witness whereof I have hereunto set my hand in presence of two witnesses.

GABRIEL DUBUIS.

Witnesses:
 CARL JAMES SCHULTZ,
 WILLIAM FREDERICK NEWCOMER.